(12) United States Patent
Richard et al.

(10) Patent No.: US 11,325,783 B2
(45) Date of Patent: May 10, 2022

(54) SYSTEM FOR ASSEMBLING A MODULAR SPIRAL CHUTE AND ASSOCIATED METHODS

(71) Applicant: TALOS ENGINEERED PRODUCTS, LLC, Franklin, TN (US)

(72) Inventors: Jathan Richard, Spring Hill, TN (US); Matt Harvey, Murfreesboro, TN (US); Ivanhoe Chaput, La Vergne, TN (US); Matthew Green, Petersburg, TN (US)

(73) Assignee: TALOS ENGINEERING PRODUCTS, LLC, Franklin, TN (US)

( * ) Notice: Subject to any disclaimer, the term of this patent is extended or adjusted under 35 U.S.C. 154(b) by 0 days.

(21) Appl. No.: 17/194,866

(22) Filed: Mar. 8, 2021

(65) Prior Publication Data

US 2021/0276808 A1  Sep. 9, 2021

Related U.S. Application Data

(60) Provisional application No. 62/986,141, filed on Mar. 6, 2020.

(51) Int. Cl.
*B65G 11/18* (2006.01)
*B65G 11/06* (2006.01)

(52) U.S. Cl.
CPC ............ *B65G 11/18* (2013.01); *B65G 11/063* (2013.01)

(58) Field of Classification Search
None
See application file for complete search history.

(56) References Cited

U.S. PATENT DOCUMENTS

| | | | |
|---|---|---|---|
| 964,444 A * | 7/1910 | Mowery | B07B 13/11 193/12 |
| 1,312,995 A | 8/1919 | Lister | |
| 1,515,890 A | 11/1924 | Sekulski | |
| 1,515,965 A | 11/1924 | Pardee | |
| 2,204,828 A | 6/1940 | Sherrill | |
| 2,437,259 A | 3/1948 | Kautz | |
| 2,708,995 A | 5/1955 | Saliba | |
| 3,280,993 A | 10/1966 | Wolfe | |
| 3,565,226 A | 2/1971 | Winchester | |
| 4,858,750 A | 8/1989 | Cawley | |
| 5,141,102 A | 8/1992 | Roinestad et al. | |
| 5,154,488 A | 10/1992 | Maxon, III | |
| 5,209,323 A | 5/1993 | Hopkins | |

(Continued)

*Primary Examiner* — William R Harp
(74) *Attorney, Agent, or Firm* — Matthew G. McKinney, Esq.; Allen, Dyer et al.

(57) ABSTRACT

A system for assembling and installing a modular spiral chute includes a base support assembly having a plurality of rear rollers and a slot, where the slot is orientated in the base support assembly to receive a vertically positioned stanchion of the modular spiral chute. The system also includes a removable roller clamp having a front roller and configured to be inserted into the slot to form an aperture in the base support assembly to encircle the stanchion so that when the roller clamp is inserted into the slot the stanchion is rotatably secured vertically within the base support assembly between the plurality of rear rollers and the front roller. In addition, the system includes a caster mounted plate positioned on top of the base support assembly and configured to increase stability of the stanchion when secured within the base support assembly.

20 Claims, 6 Drawing Sheets

(56) References Cited

U.S. PATENT DOCUMENTS

| | | | |
|---|---|---|---|
| 5,598,914 | A | 2/1997 | Sulzer et al. |
| 5,794,387 | A * | 8/1998 | Crookham .............. F21V 21/36 |
| | | | 52/122.1 |
| 6,085,432 | A * | 7/2000 | Van der Sluis ....... E04G 21/185 |
| | | | 269/904 |
| 6,609,607 | B2 | 8/2003 | Woltjer et al. |
| 7,581,629 | B2 | 9/2009 | Kohler |
| 8,733,529 | B2 | 5/2014 | Heddles et al. |
| 9,751,693 | B1 | 9/2017 | Battles et al. |
| 10,040,642 | B2 | 8/2018 | Gorski |
| 10,217,074 | B1 | 2/2019 | Stallman et al. |
| 11,155,413 | B2 * | 10/2021 | Stock ................... B65G 11/183 |
| 2006/0021847 | A1 | 2/2006 | Sanchez et al. |
| 2011/0002761 | A1 | 1/2011 | Aimable-Lima et al. |
| 2017/0173645 | A1 | 6/2017 | Hashimoto |

* cited by examiner

SYSTEM FOR ASSEMBLING A MODULAR SPIRAL CHUTE AND ASSOCIATED METHODS

RELATED APPLICATIONS

The present invention claims priority to Provisional Patent Application Ser. No. 62/986,141 filed Mar. 6, 2020, the entire contents of thereof incorporated herein by reference.

FIELD

The present invention relates to the field of spiral chutes used in the shipping industry, and, more particularly, to a system for assembling and installing a modular spiral chute and associated methods.

BACKGROUND

Chutes are well-known devices for the transport of articles from a first location to another location. Commonly, articles in the chute move from an upper location to a lower location by sliding down the chute via the force of gravity. Some chutes may also provide for mechanical or human assistance in applying the necessary force to transport articles down the chute. It is further common for spiral type chutes to rotate downwardly to a selected rotational degree.

Chutes known to the art are commonly constructed of metal, fiberglass, wood, polymer, or any combination thereof. However, chutes known to the art suffer several disadvantages. Fiberglass and polymer chutes often must be created from molds. Such molds are expensive and can only be used to create exact duplicates of the mold. Additionally, molds cannot be readily adapted to accommodate desired changes in the chute structure.

Metal chutes are typically constructed from steel components that must be prefabricated by welding each component together. When a component fails or is damaged, repairs are expensive and time consuming. Repairs commonly require cutting or removal of one or more of the components. In many cases, the entire chute must be removed to make repairs. The chute must also be re-welded after repairs are finished. While metal chutes may often accommodate heavier articles, such chutes are often heavy and, therefore, expensive and difficult to install, remove, or modify in any manner. Further, prefabricated metal chutes are difficult and expensive to ship to a desired location and time consuming to assemble and install.

There is therefore a need for an improved system and method for assembling a spiral chute, which allows for increased efficiency in the assembling of the spiral chute and at the same time is more cost effective.

SUMMARY

A system to increase the efficiency of assembling and installing a modular spiral chute is disclosed. The system includes a base support assembly having a plurality of rear rollers and a slot, where the slot is orientated in the base support assembly to receive a vertically positioned stanchion of the modular spiral chute. The system also includes a removable roller clamp configured to be inserted into the slot to form an aperture in the base support assembly to encircle the stanchion and to work in conjunction with the plurality of rear rollers to rotatably secure the stanchion vertically within the base support assembly. The plurality of rear rollers are orientated to rotate about a vertical axis.

The roller clamp may have at least one spring that is configured to maintain compression of the plurality of rear rollers to the stanchion. The roller clamp may also have a front roller so that when the roller clamp is inserted into the slot, the stanchion is rotatably secured vertically within the base support assembly between the plurality of rear rollers and the front roller.

The system may also include a caster mounted plate positioned on top of the base support assembly and be configured to increase stability of the stanchion when secured within the base support assembly. The castor mounted plate has a plurality of castors and an aperture aligned with the aperture in the base support assembly to encircle the stanchion. The castor mounted plate may comprise two halves that are substantially mirror images of one another and be configured to rotate while the base support assembly remains stationary when the stanchion is rotated.

The base support assembly may include a plurality of wheels orientated to roll the base along a surface, and a plurality of adjustable leg supports configured to elevate the base support assembly above a surface to prevent the base support assembly from moving.

In another aspect, a method of assembling a modular spiral chute is disclosed. The method includes providing a base support assembly having a plurality of rear rollers and a slot, where the slot is orientated in the base to receive a vertically positioned stanchion of the modular spiral chute. The method also includes positioning the stanchion within the slot, where the stanchion comprises a plurality of apertures for receiving rib assemblies of the spiral chute. In addition, the method includes securing a removable roller clamp around the stanchion in conjunction with the plurality of rear rollers to rotatably secure the stanchion vertically within the base support assembly, installing a plurality of rib assemblies and linings in a spiral pattern along the stanchion, and rotating the stanchion while secured within the base support assembly in order to install each of the rib assemblies in the spiral pattern along the stanchion.

The method may also include positioning a caster mounted plate on top of the base support assembly and securing the caster mounted plate to the stanchion, where the castor mounted plate is configured to increase stability of the stanchion when it is secured within the base support assembly. The method may include maintaining compression of the front roller and the plurality of rear rollers to the stanchion using at least one spring of the removable roller clamp, where the caster mounted plate is configured to rotate while the base remains stationary when the stanchion is rotated.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now to FIGS. 1-4, a system for assembling and installing a modular spiral chute is disclosed and generally designated 100. The system 100 includes a base support assembly 102 having a plurality of rear rollers 128a, 128b, 130a, 130b. The rear rollers 128a, 128b are spaced apart and aligned vertically to one another on a left side of the base support assembly 102, and the rear rollers 130a, 130b are similarly spaced apart and aligned vertically to one another on a right side of the base support assembly 102. Those of ordinary skill in the art can appreciate that other configurations, shapes and sizes of the rollers could be used other than as shown in the drawings.

Figure 9:
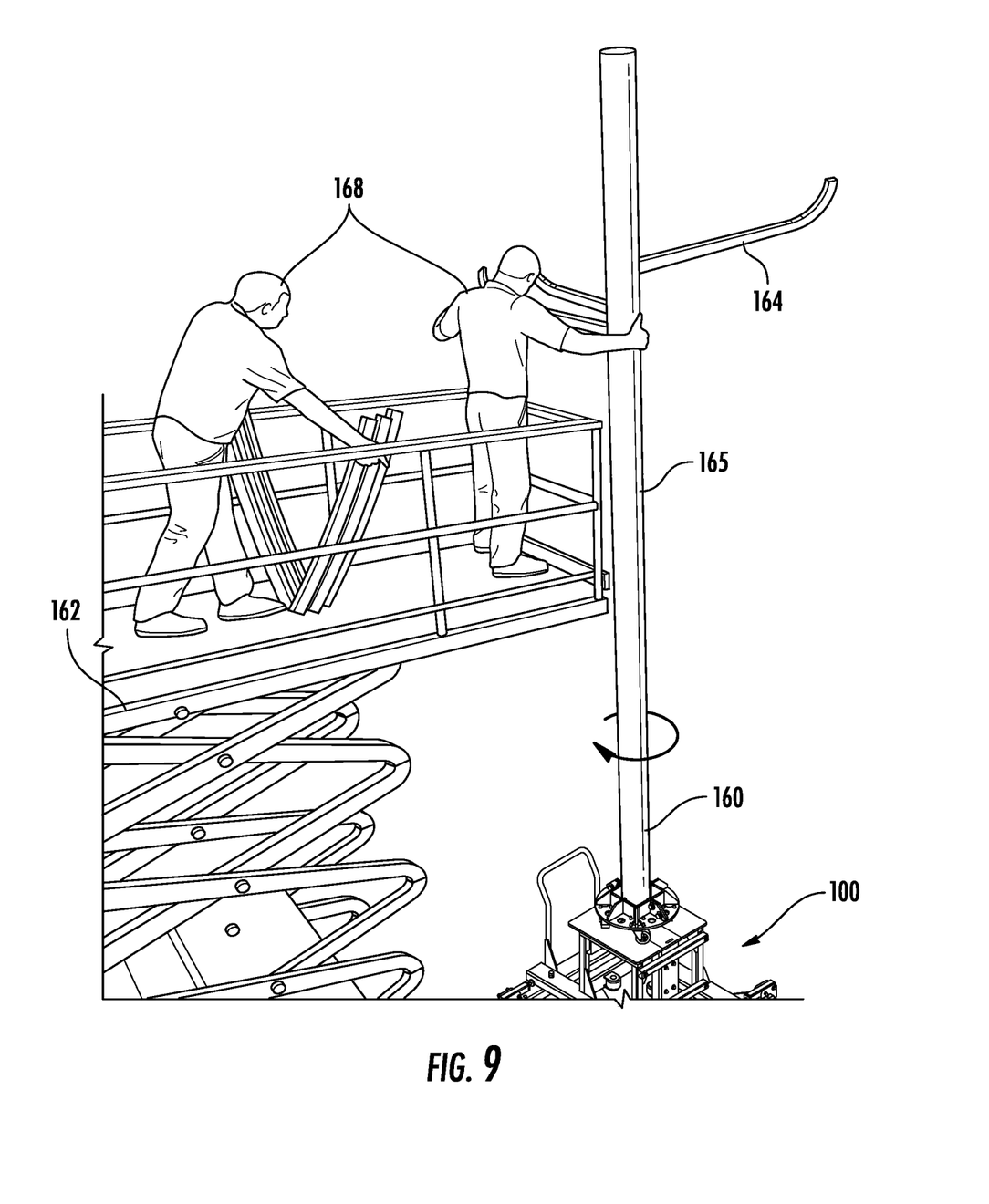
FIG. 9 is a perspective view of workers on a scissor lift beginning to attach rib assemblies of a modular spiral chute to a stanchion using the system shown in FIG. 1.
Figure 10:
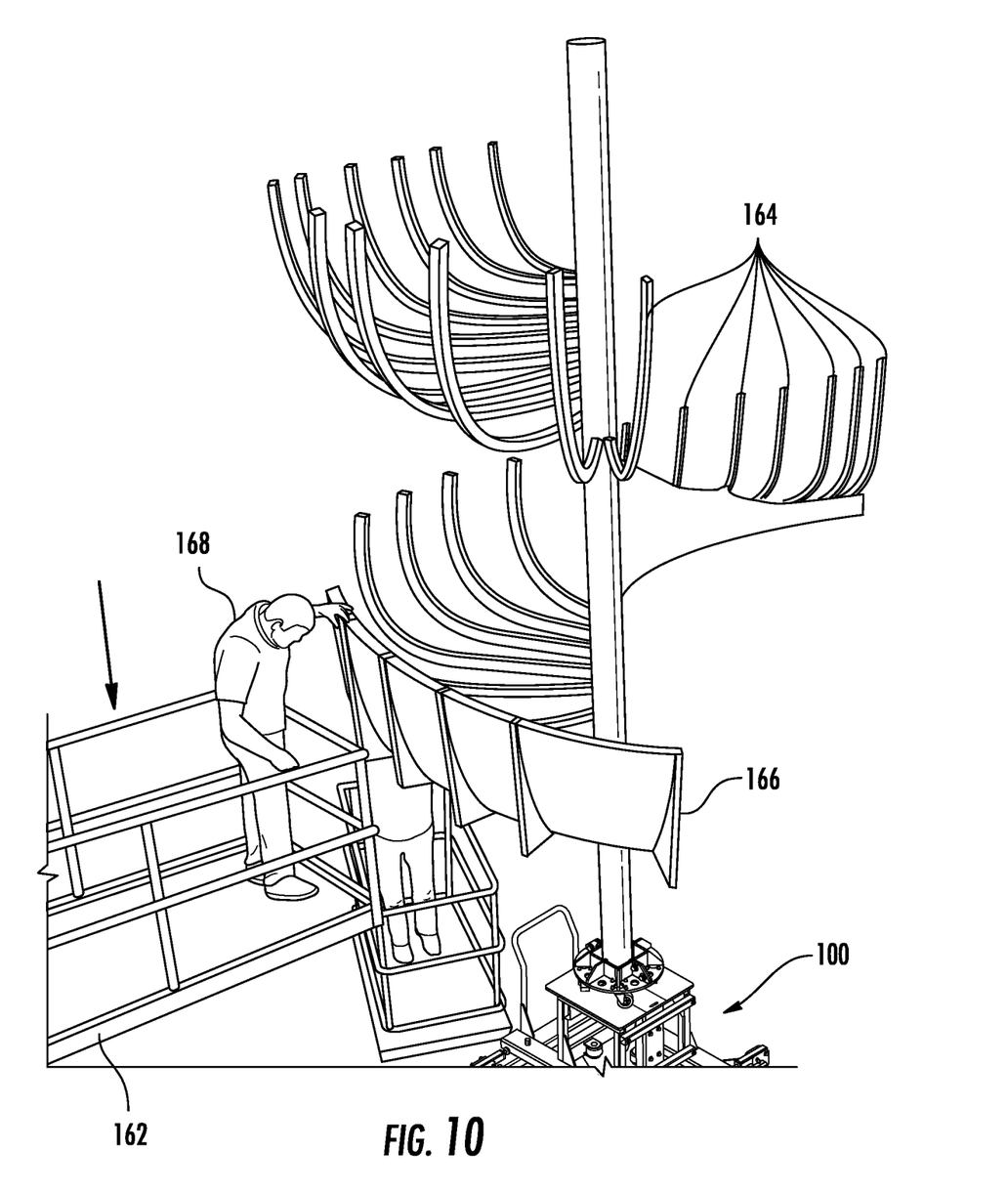
FIG. 10 is a perspective view showing the rib assemblies being installed from top to bottom of the stanchion by rotating the stanchion and without moving the scissor lift around the stanchion.
Figure 11:
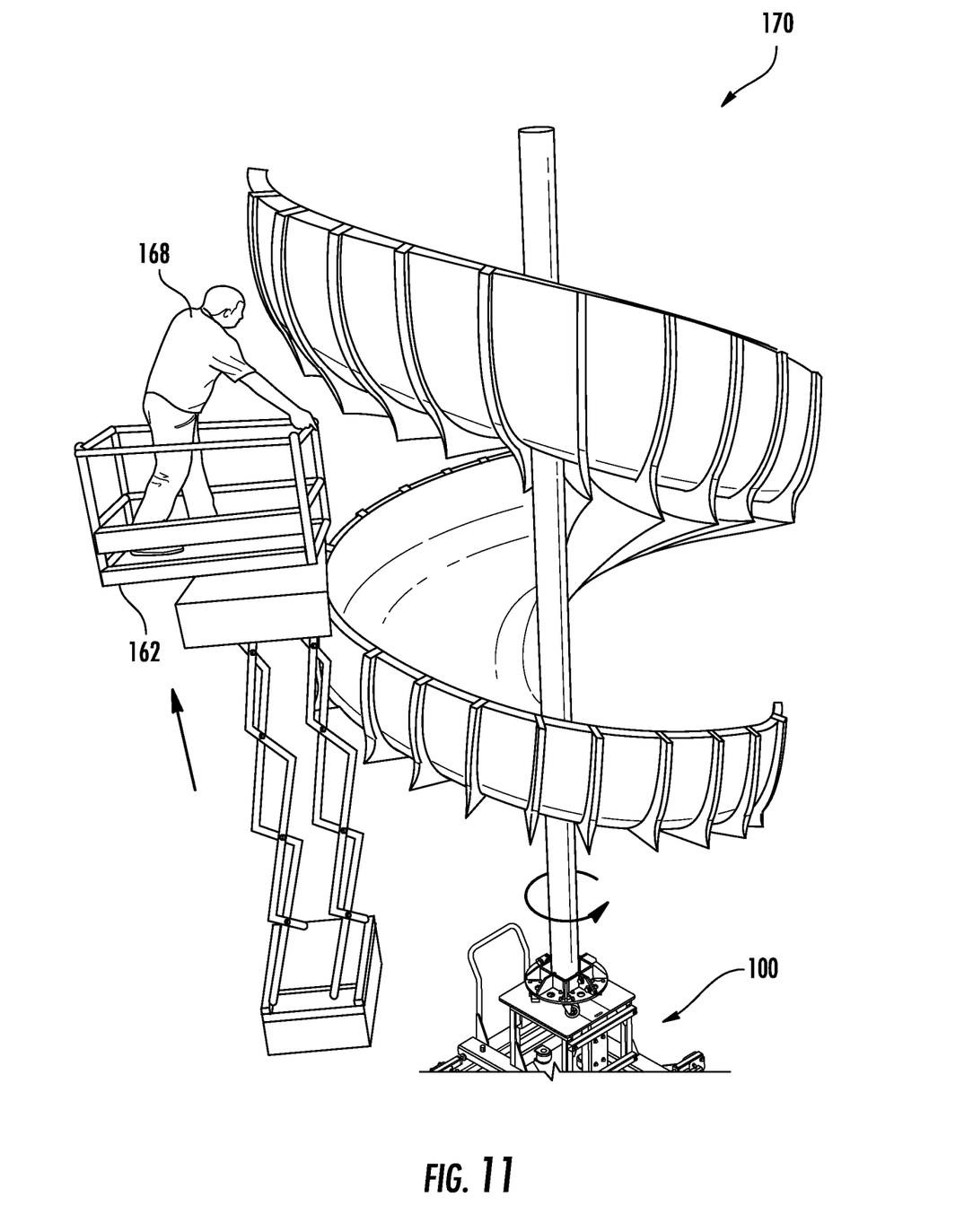
FIG. 11 is a perspective view of the modular spiral chute fully assembled.

The base support assembly 102 includes a platform 114 that has a slot 125 formed therein. The slot 125 may be U-shaped and is orientated in the base support assembly 102 to receive a vertically positioned stanchion 160 of a modular spiral chute 170. The stanchion 160 is a round pole that is used as a center support for the spiral chute 170 as illustrated in FIGS. 9-11 discussed below. Accordingly, the stanchion 160 can be positioned vertically on a ground surface and the base support assembly 102 pushed forward so that the stanchion 160 slides into the slot 125 until contact is made with the rear rollers 128a, 128b, 130a, 130b.

The system 102 also includes a caster mounted plate 104 positioned on top of the base support assembly 102 and is configured to increase stability of the stanchion 160 when secured within the base support assembly 102. The castor mounted plate 104 has a plurality of castors 118 and an aperture 134 aligned with the aperture 125 in the base support assembly 102 to encircle the stanchion 160. The castor mounted plate 104 is configured to rotate on the castors 118 while the base support assembly 102 remains stationary when the stanchion 160 is rotated.

The base support assembly 102 may include a plurality of wheels 110a, 110b and 112a, 112b that are orientated to roll the base 102 along a surface. In particular, the base support assembly 102 can be rolled up to a vertically positioned stanchion 160. Once the base support assembly 102 is in place around the stanchion 160, a plurality of adjustable leg supports 120a, 120b, 122a, 122b can be rotated out and down to the ground surface. The leg supports 120a, 120b, 122a, 122b are configured to elevate the wheels 110a, 110b and 112a, 112b of the base support assembly 102 above the surface to prevent the base support assembly 102 from moving and keep it stationary. In addition, the leg supports 120a, 120b, 122a, 122b can be adjusted so that a bottom end of the stanchion 160 can also be lifted off the surface so that it rotates freely.

Figure 1:
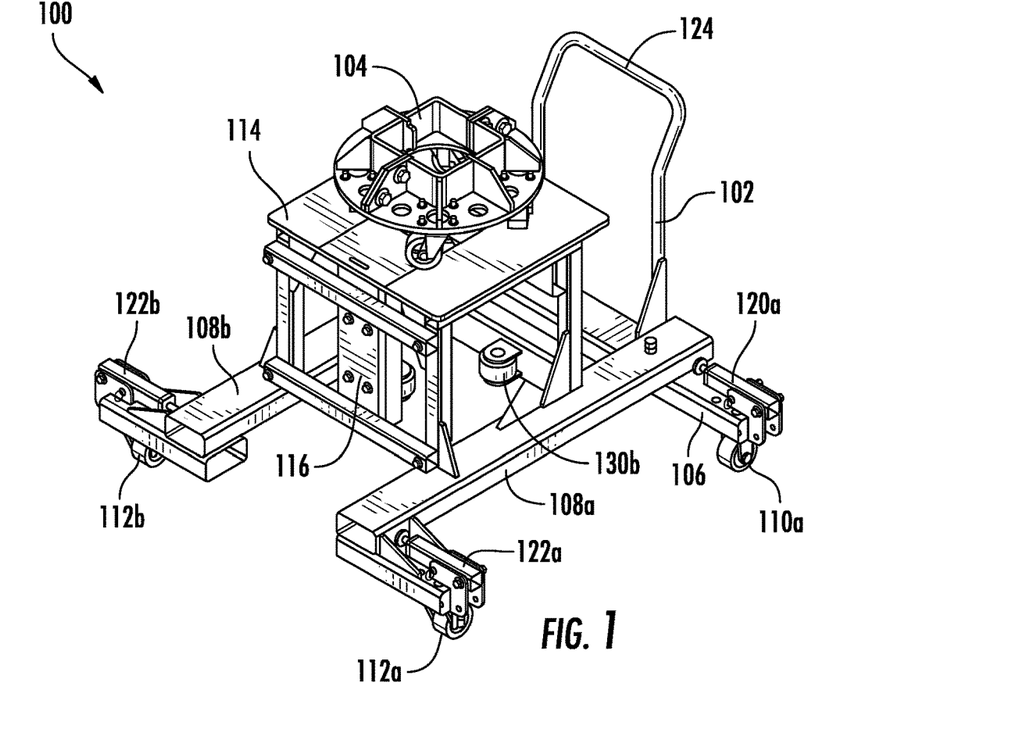
FIG. 1 is a perspective view of a system for assembling a modular spiral chute in accordance with particular aspects of the invention disclosed herein.
Figure 2:
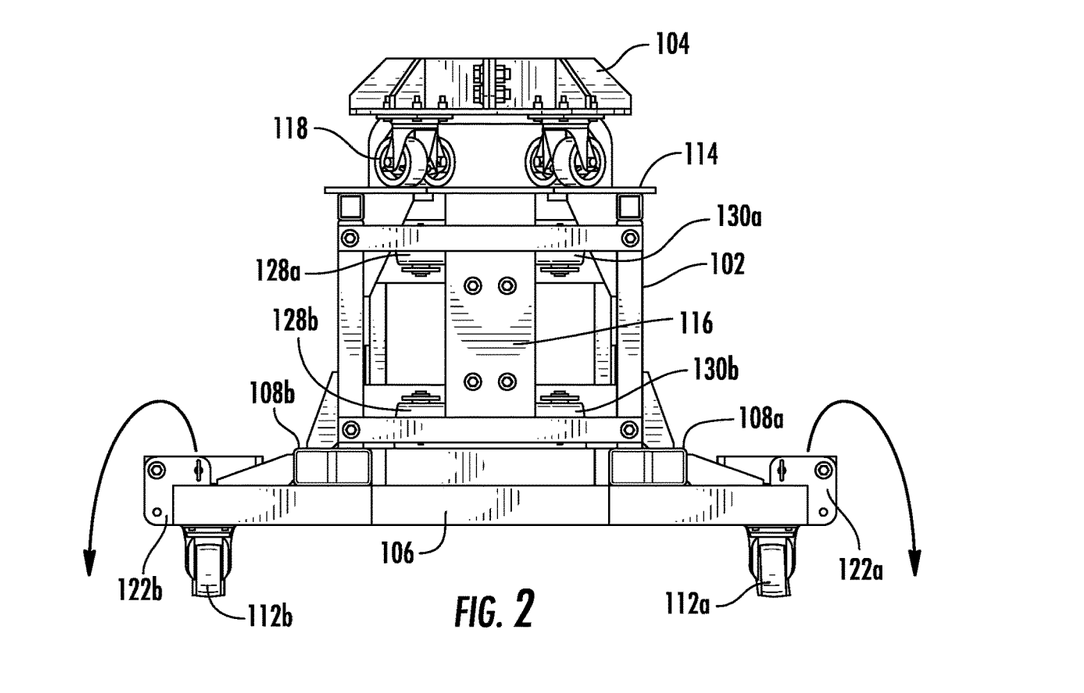
FIG. 2 is a front view of the system of FIG. 1.
Figure 3:
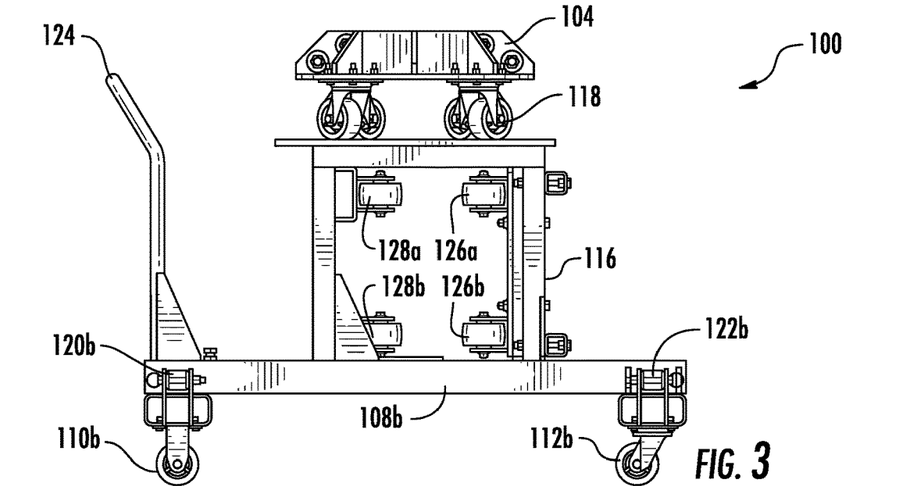
FIG. 3 is a left side view of the system of FIG. 1.
Figure 4:
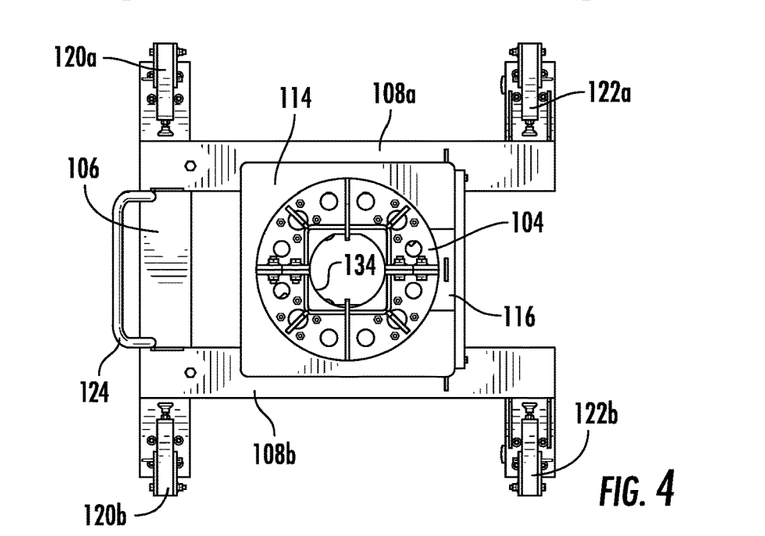
FIG. 4 is a top view of the system of FIG. 1.

In order to secure the stanchion 160 within the base support assembly 102, the system 100 also includes a removable roller clamp 116 that is configured to be inserted into the slot 125 once the stanchion is within the slot 125. The roller clamp 116 is shown secured in place in FIGS. 1-4. The roller clamp 116 forms an aperture 134, as shown in FIG. 4, with the platform 114 of the base support assembly 102 to encircle the stanchion. The roller clamp 116 also includes front rollers 142a, 142b that work in conjunction with the plurality of rear rollers 128a, 128b, 130a, 130b to rotatably secure the stanchion vertically within the base support assembly 102.

The plurality of rear rollers 128a, 128b, 130a, 130b and the front rollers 142a, 142b of the roller clamp 116 are orientated to rotate about a vertical axis. Thus, the stanchion 160, which is also aligned vertically, can be rotated to assemble the spiral chute 170.

Figure 5:
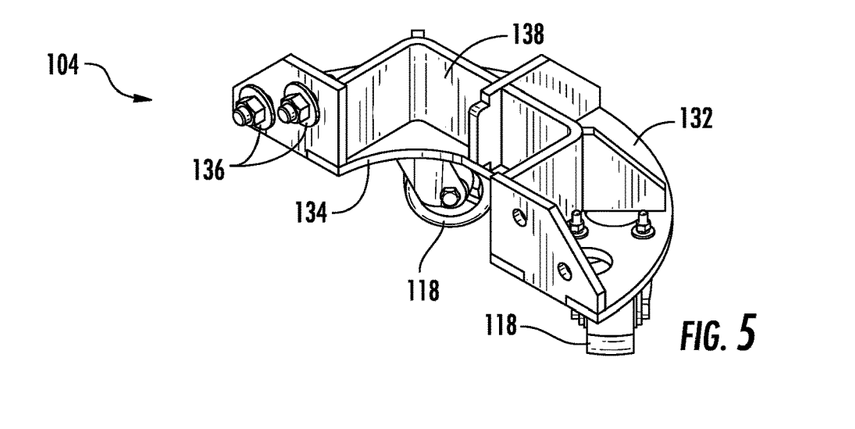
FIG. 5 is a perspective view of one-half of a castor mounted plate of the system of FIG. 1.

The castor mounted plate 104 may comprise two halves, where one half is shown in FIG. 5, that are substantially mirror images of one another and are configured to be secured together. The two halves are secured around the stanchion 160 using bolts 136 that pass through a sidewall 138 that extends from the surface of a plate 132.

Figure 6:
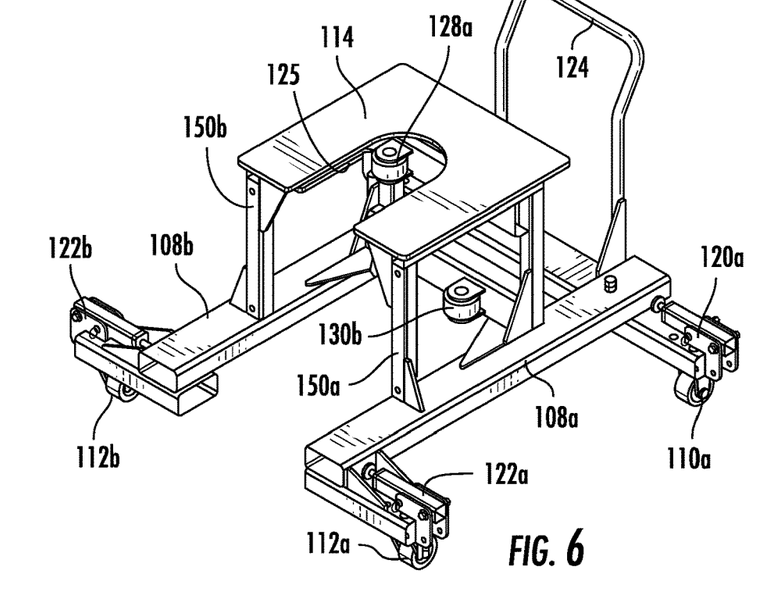
FIG. 6 is a perspective view of a base of the system of FIG. 1 shown without the caster mounted plate and roller clamp.
Figures 7, 8:
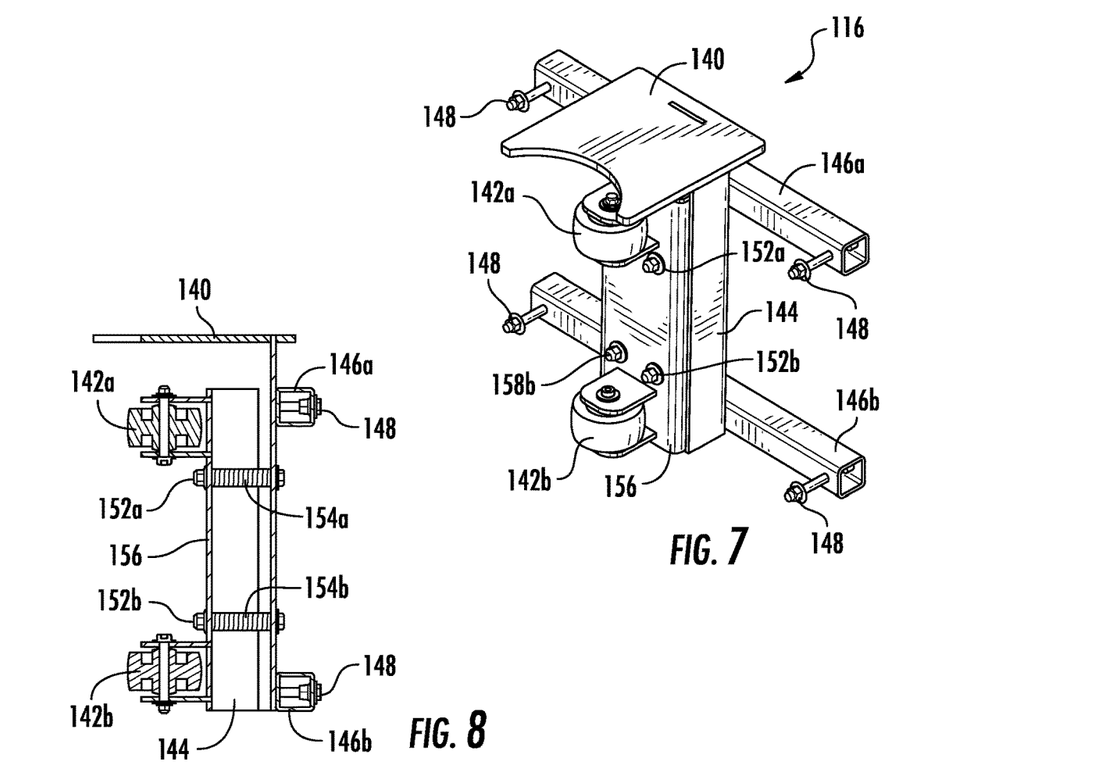
FIG. 7 is a perspective view of a roller clamp of the system of FIG. 1.
FIG. 8 is a cross sectional view of the roller clamp of FIG. 7.

Referring now to FIGS. 6-8, the roller clamp 116 has been removed from the base 102 so that the slot 125 within the platform 114 of the base 102 is visible. The roller clamp 116 includes a faceplate 156 that is configured to slide into a vertical strut 144 of the roller clamp 116. An upper horizontal strut 146a and lower horizontal strut 146b support the vertical strut 144 and are also used to secure the roller clamp 116 to the base support assembly 102 using bolts 148 to front members 150a, 150b of the base support assembly.

The vertical strut 144 may comprise a U-channel so that the faceplate 156 is adjustable of how far it extends into the vertical strut 144 as bolts 152a, 152b, 156a, 156b are tightened or loosened. In addition, each of the bolts 152a, 152b, 158a, 158b have a spring that is configured to maintain compression of the front rollers 142a, 142b and the plurality of rear rollers 128a, 128b, 130a, 130b to the stanchion. The stanchion is rotatably secured vertically within the base support assembly 102 between the plurality of rear rollers 128a, 128b, 130a, 130b and the front rollers 142a, 142b.

Referring now to FIGS. 9-11, the steps in assembling the modular spiral chute 170 using the system 100 described above is illustrated. For example, in FIG. 9 the workers 168 are on a scissor lift 162 installing a plurality of rib assemblies 164 to the stanchion 160. They work from the top of the stanchion 160 to the bottom as shown in FIGS. 9 and 10. This is accomplished without moving the scissor lift 162 around the stanchion 160. Instead the workers rotate the stanchion 160, which saves time in not having to reposition the scissor lift 162 to install the rib assemblies.

Similarly, when installing the linings 166 to the rib assemblies 164, the workers 168 are not required to reposition the scissor lift 162. Instead, the stanchion 160 is rotated by the workers 168 and the workers 168 raise and lower the scissor lift 162 in place to complete the assembly of the modular spiral chute 170 as shown in FIG. 11.

Once the modular spiral chute 170 is assembled, the system 100 can be used to position and install the spiral chute 170 in the desired location by maneuvering the base 102, which is on wheels 110*a*, 110*b*, 112*a*, 112*b*. The stanchion 160 of the spiral chute 170 can then be secured to a foundation by bolts or other similar fasteners while the spiral chute 170 is held firmly by the system 100. After the stanchion 160 is secured to the foundation, the caster mounted plate 104 and the roller clamp 116 can be removed so that the base 102 can roll freely away from the installed spiral chute 170.

The method of assembling the modular spiral chute 170 includes providing the base support assembly 102 having a plurality of rear rollers 128*a*, 128*b*, 130*a*, 130*b* and a slot 125 in the platform 114, where the slot 125 is orientated in the base 102 to receive the vertically positioned stanchion 160 of the modular spiral chute 170. The method also includes positioning the stanchion 160 within the slot 125, where the stanchion 160 comprises a plurality of apertures 165 for receiving rib assemblies 165 that provide structural support for the spiral chute 170.

In addition, the method includes securing the removable roller clamp 116 around the stanchion 160 in conjunction with the plurality of rear rollers 128*a*, 128*b*, 130*a*, 130*b* to rotatably secure the stanchion 160 vertically within the base support assembly 102. The method also includes installing a plurality of rib assemblies 164 and linings 166 in a spiral pattern along the stanchion 160, and rotating the stanchion 160 while secured within the base support assembly 102 in order to install each of the rib assemblies 164 in the spiral pattern along the stanchion 160.

The method may also include positioning a caster mounted plate 104 on top of the base support assembly 102 and securing the caster mounted plate 104 directly to the stanchion 160, where the castor mounted plate 104 is configured to increase stability of the stanchion 160 when it is secured within the base support assembly 102. The method may include maintaining compression of the front rollers 142*a*, 142*b* and the plurality of rear rollers 128*a*, 128*b*, 130*a*, 130*b* to the stanchion 160 using at least one spring 154*a*, 154*b* of the removable roller clamp 116, where the caster mounted plate 104 is configured to rotate while the base 102 remains stationary when the stanchion 160 is rotated.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

That which is claimed is:

1. A system for assembling and installing a modular spiral chute, the system comprising:
   a base support assembly having a plurality of rear rollers and a slot, wherein the slot is orientated in the base support assembly to receive a vertically positioned stanchion of the modular spiral chute; and
   a removable roller clamp configured to be inserted into the slot to form an aperture in the base support assembly to encircle the stanchion and to work in conjunction with the plurality of rear rollers to rotatably secure the stanchion vertically within the base support assembly.

2. The system of claim 1, wherein the slot is formed in a top portion of the base support assembly.

3. The system of claim 1, wherein the roller clamp comprises at least one spring that is configured to maintain compression of the plurality of rear rollers to the stanchion.

4. The system of claim 1, wherein the roller clamp comprises a front roller so that when the roller clamp is inserted into the slot the stanchion is rotatably secured vertically within the base support assembly between the plurality of rear rollers and the front roller.

5. The system of claim 1, further comprising a caster mounted plate positioned on top of the base support assembly and configured to increase stability of the stanchion when secured within the base support assembly.

6. The system of claim 5, wherein the caster mounted plate comprises an aperture aligned with the aperture in the base support assembly to encircle the stanchion.

7. The system of claim 6, wherein the castor mounted plate comprises two halves that are substantially mirror images of one another.

8. The system of claim 7, wherein the caster mounted plate is configured to rotate while the base support assembly remains stationary when the stanchion is rotated.

9. The system of claim 1, wherein the base support assembly comprises a plurality of wheels orientated to roll the base along a surface.

10. The system of claim 1, wherein the base support assembly comprises a plurality of adjustable leg supports configured to elevate the base support assembly above a surface to prevent from moving.

11. The system of claim 1, wherein the plurality of rear rollers are orientated to rotate about a vertical axis.

12. The system of claim 1, wherein the castor mounted plate comprises a plurality of castors.

13. A system for assembling and installing a modular spiral chute, the system comprising:
    a base support assembly having a plurality of rear rollers and a slot, wherein the slot is orientated in the base support assembly to receive a vertically positioned stanchion of the modular spiral chute;
    a removable roller clamp having a front roller and configured to be inserted into the slot to form an aperture in the base support assembly to encircle the stanchion so that when the roller clamp is inserted into the slot the stanchion is rotatably secured vertically within the base support assembly between the plurality of rear rollers and the front roller; and
    a caster mounted plate positioned on top of the base support assembly and configured to increase stability of the stanchion when secured within the base support assembly.

14. The system of claim 13, wherein the roller clamp comprises at least one spring that is configured to maintain compression of the plurality of rear rollers and the front roller to the stanchion.

15. The system of claim 13, wherein the caster mounted plate comprises an aperture aligned with the aperture in the base support assembly to encircle the stanchion.

16. The system of claim 15, wherein the caster mounted plate is configured to rotate while the base support assembly remains stationary when the stanchion is rotated.

17. A method of assembling a modular spiral chute, the method comprising:
- providing a base support assembly having a plurality of rear rollers and a slot, wherein the slot is orientated in the base to receive a vertically positioned stanchion of the modular spiral chute;
- positioning the stanchion within the slot, wherein the stanchion comprises a plurality of apertures for receiving rib assemblies of the spiral chute;
- securing a removable roller clamp around the stanchion in conjunction with the plurality of rear rollers to rotatably secure the stanchion vertically within the base support assembly;
- installing a plurality of rib assemblies and linings in a spiral pattern along the stanchion; and
- rotating the stanchion while secured within the base support assembly in order to install each of the rib assemblies in the spiral pattern along the stanchion.

18. The method of claim 17, further comprising positioning a caster mounted plate on top of the base support assembly and securing the caster mounted plate to the stanchion, wherein the castor mounted plate is configured to increase stability of the stanchion when it is secured within the base support assembly.

19. The method of claim 18, further comprising maintaining compression of the front roller and the plurality of rear rollers to the stanchion using at least one spring of the removable roller clamp.

20. The method of claim 18, wherein the caster mounted plate is configured to rotate while the base remains stationary when the stanchion is rotated.

* * * * *